Oct. 7, 1969 K. E. HAIRE 3,471,770
PULSED CURRENT GENERATING CIRCUITS
Filed March 30, 1966 3 Sheets-Sheet 1

INVENTOR
KENNETH E. HAIRE

BY Henry Powers
ATTORNEY

PULSED CURRENT GENERATING CIRCUITS

Filed March 30, 1966 3 Sheets-Sheet 2

3,471,770

PULSED CURRENT GENERATING CIRCUITS

Kenneth E. Haire, Poughkeepsie, N.Y., assignor to International Business Machines Corporation, Armonk, N.Y., a corporation of New York Filed Mar. 30, 1966, Ser. No. 538,858
Int. Cl. H02j *1/04, 3/10*
U.S. Cl. 323—1 6 Claims

ABSTRACT OF THE DISCLOSURE

A constant current pulse generator using gating and start amplitude pulses, initiates a voltage pulse which is sent to a current regulator. This regulator, using a constant voltage supply as a source, generates an increasing current pulse which is sent to a load. Concurrently, this current is sensed in magnitude by a detector and compared to a D.C. reference voltage. When a preselected level is reached the detector produces a very fast rise-time pulse which is sent back to the pulse generator as a stop and clamp amplitude pulse to hold the current regulator at a constant value to provide a fixed constant current at the load. The current pulse is ended when the gate pulse returns to the original level.

This invention relates to pulse current generating circuits, and more particularly this invention relates to constant current pulse generators useful in test circuits for measurement of current gain and other characteristics of electron transfer devices such as transistors and the like.

Pulse generating circuits have been found to be valuable in semiconductor testing. A pulse signal does not affect the semiconductor parameters which are temperature dependent. The short test pulse produces considerably less power loss and hence temperature rise than the continuous test signals generally employed in the semiconductor testing art. One problem in pulse generating circuits is the provision of a constant current pulse source which is necessary for precise measurement of semiconductor transfer characteristics. Another problem is the provision of a programmable constant current source which may be readily altered to desired preselected values so as to enable the testing of a wide variety of semiconductor devices.

Accordingly, a general object of this invention is an improved pulse generator for providing a programmable constant current useful, in form, for transfer test circuits.

Another object is a constant current pulse generator which is substantially insensitive to oscillations caused by interaction between the generator and a load, the generator being independent of any non-linear characteristics of components therein.

A further object is a pulse generator which can be used with a novel test circuit for the measurement of current gain and other characteristics of electron transfer devices.

The pulse generator disclosed herein produces a constant current pulse whose amplitude can be accurately controlled with reference to a preselectable voltage reference source. This pulse generator is substantially insensitive to oscillations caused by interaction between the generator and the load, and whose accuracy is independent of any non-linear characteristics of its components. The additional advantage of the very fast response of this pulse generator in the micro-second region, makes it very useful for many applications, as for example, for the measurement of current gain and other characteristics of electron transfer devices such as transistors and the like.

A conjoint feature of this invention is the use of such a pulse generator in conjunction with a special test circuit, disclosed herein, which embodies a high degree of inherent system stability for the testing of the indicated electron transfer devices.

The foregoing and other objects, features and advantages of the invention will be apparent from the following more particular description of a preferred embodiment of the invention, as illustrated in the accompanying drawings in which.

Figure 3:
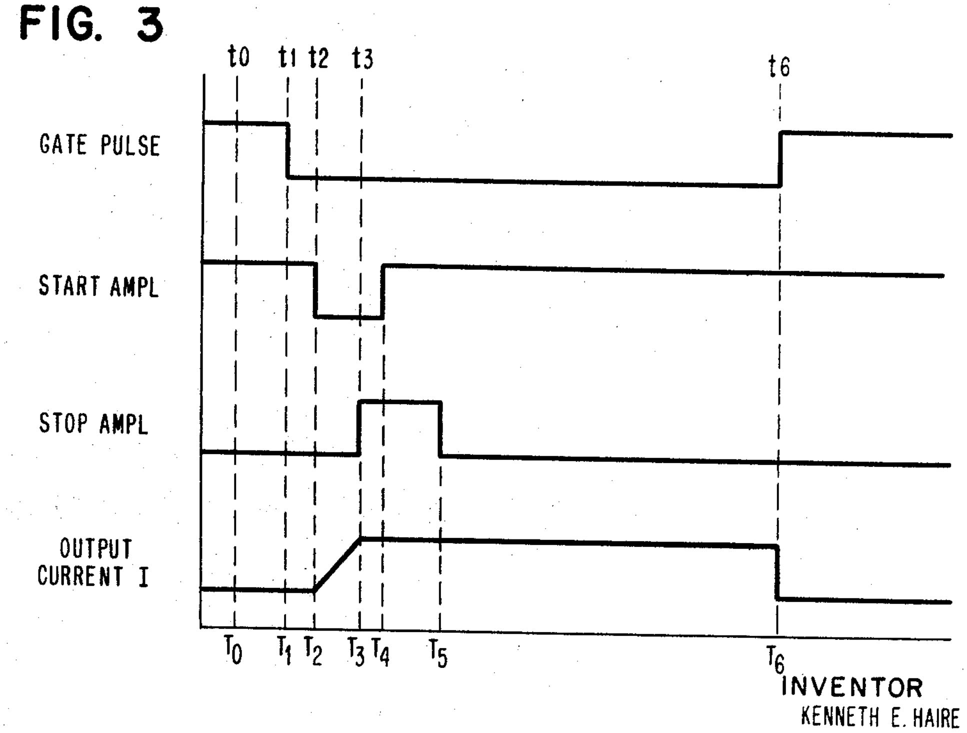
Figure 2:
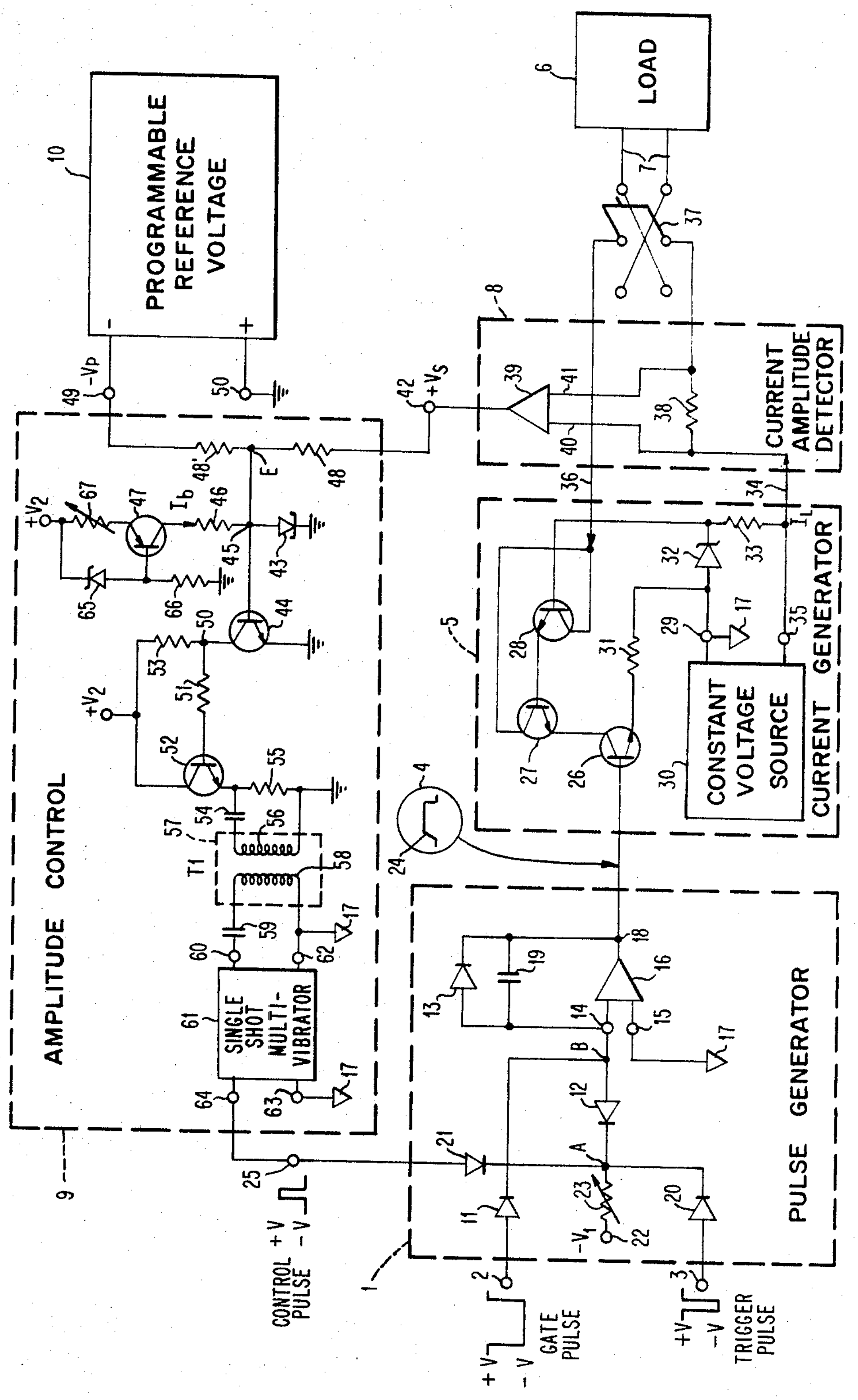
FIGURE 2 is a detailed electrical schematic circuit of one embodiment of the pulse generator of this invention.
Figure 2A:
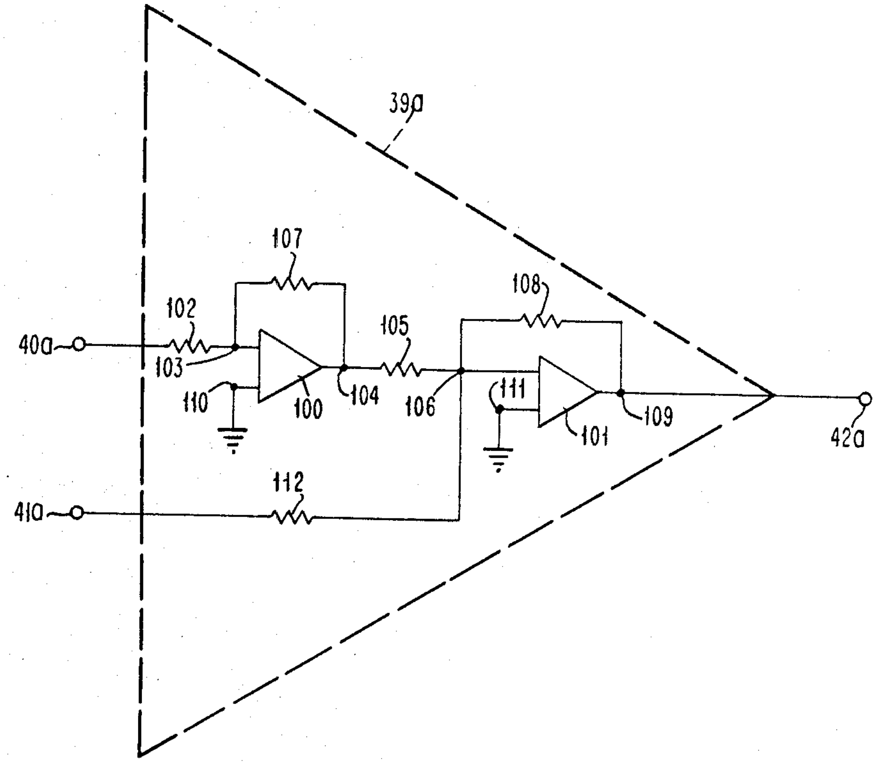
Figure 2B:
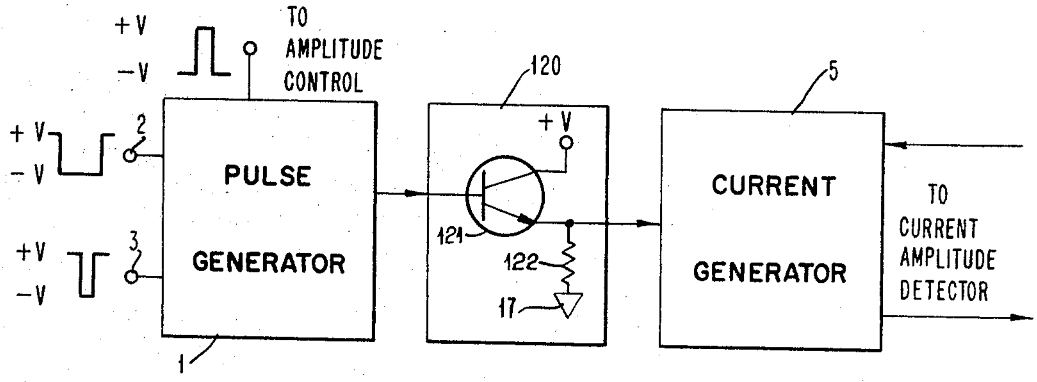

FIGURE 2*a* illustrates a modification in electrical schematic form to the circuit of FIGURE 2;

FIGURE 2*b* illustrates, in electrical schematic form, another modification of the pulse generator of this invention; and FIGURE 3 depicts waveforms to show the amplitude time relationship of various signals which may be employed in the generator.

Figure 1:
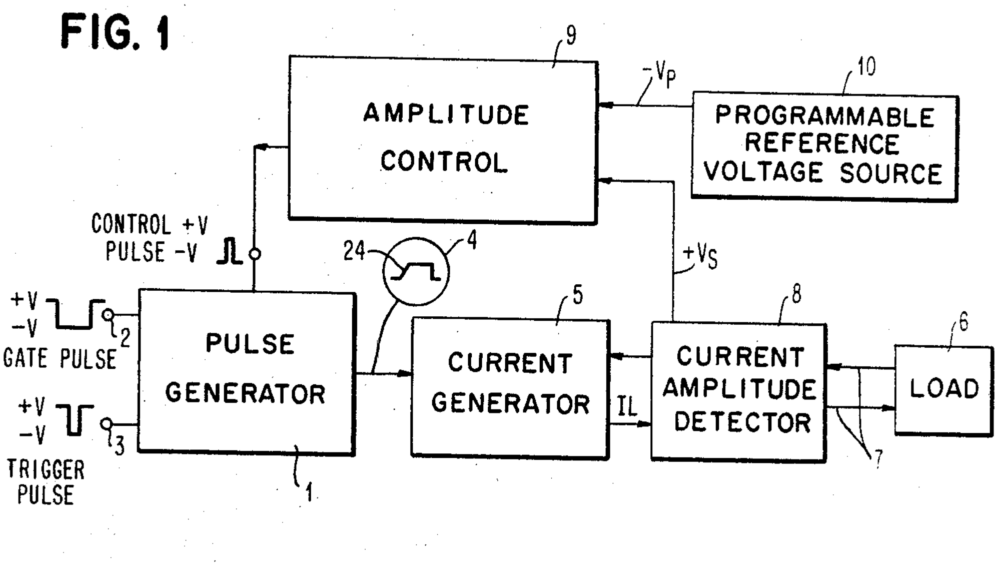
FIGURE 1 is a block diagram of a circuit of this invention.

Generally speaking, the invention comprises, with reference to FIGURE 1, a pulse generator 1 having an input terminal 2 to which is applied a gate pulse to activate the pulse generator and a delayed second width short pulsed signal to initiate a current waveform 4 whose pulse width is determined by the remaining period of the gate pulse. Both of the gate and trigger pulses are of the type conventionally employed for various application wherein the pulses may alternate between negative and positive excursions from a base line wherein the signal to the pulse generator is applied during the negative excursions of the pulse. As will be apparent, control of the external sources of the gate and trigger pulse may be employed to program any desired generated waveform pulse width and duty cycle to the pulse generator. In general, the pulse width of the generated waveform may be controlled by selected programming of the pulse width of the gate pulse ($t_1$—$t_6$ FIG. 3), and after a delay ($t_1$—$t_2$), of the smaller pulse width trigger signal ($t_2$—$t_4$). In similar fashion, the duty cycle of the generator can be controlled by like programming of the frequency of the negative excursions of the gate pulse. Normally, the generator will be employed at a pulse width of 300 $\mu$s.$\pm$30 $\mu$s. with a duty of $\leq$2%.

The output waveform 4 from pulse generator 1 is passed to a current generator 5 which produces a current wave form $I_L$ which is directly proportional to the waveform output 4 of pulse generator 1. This current $I_L$ from current generator 5 to a load in the output path 7 is sensed in magnitude by a current magnitude detector 8 where it is converted to a potential $V_S$ and fed to the amplitude control 9 where it is compared to the potential $V_P$ of a programmable reference voltage source 10. At some time when the potential $V_S$ of amplitude detector 8 has increased to the value of the reference potential $V_P$, the amplitude control 9 will generate a control pulse ($t_3$—$t_5$), having a very fast rise time, to fix the amplitude of the voltage waveform 4 (generated at this time) for the duration of the gate pulse and, thus, concurrently fixing the amplitude of the current $I_L$ of current generator 5 and thus maintaining a fixed constant current at the load 6.

More specifically, referring to FIGURE 2, the pulse generator 1, includes a diode 11 whose anode is connected to the input terminal 2 to which a preset gating pulse is applied. The cathode of diode 11 is connected in common to the anodes of a pair of diodes 12 and 13, and to an input terminal 14 of an amplifier 16 a second input terminal 15 connected to a common reference 17. The cathode of diode 13 is connected to an output terminal 18 of the amplifier 16 which generates the indicated voltage waveform 4. A capacitor 19 is also connected across the amplifier terminals 14 and 18 in parallel circuit with diode 13. It is to be understood that all amplifiers which are mentioned herein, including amplifier 16 are conventional operational type amplifiers, and are shown as such by conventional symbols in the drawing. A typical amplifier for use in generating such a voltage waveform 4 is the commercial model P45A of the Philbrick Research, Inc., Boston, Mass.

The other side or cathode of diode 12 is connected in common with the cathodes of a pair of diodes 20 and 21, and to a source of negative potential, $-V_1$, at terminal 22, through a variable resistor 23 whose setting will determine the rate of rise of the voltage waveform 4's leading edge ramp 24. The anode of diode 20 is in turn connected to the terminal 3 to which the preset trigger pulse is applied. The circuit of the pulse generator is completed by connection of the anode of diode 21 to a terminal 25 where the pulse generator circuit will be functionally connected to the amplitude control 9.

Where desired, the aforedescribed portion circuit of the pulse generator 1 can be readily modified as shown in FIGURE 2*b* to accommodate an amplifier 16 having a low output impedance. In such event, it is only necessary to insert an output amplifier 120 between the output of the pulse generator 1 and the input of the current generator 5. in its simplest form, such an amplifier 120 can comprise an NPN transistor 121 having its base connected to the output of amplifier 16, in pulse operator 1, and its collector connected to the positive potention $+V$. The circuit is continued by a common connection of the emitter of transistor 121 to the base of transistor 26, in the current generator 5 and through resistor 122 to common reference 17.

The current generator 5 includes an NPN transistor 26 in cascode arrangement with an NPN transistor 27 which in turn is connected in a Darlington circuit with an NPN transistor 28. The current generator 5 is integrated with the pulse generator 1 by electrical connection between the output terminal 18 of amplifier 16, and the base of transistor 26 whose emitter is connected in common to the reference potential 17 and the negative terminal 29, of a constant source 30, through a resistor 31. The collector of transistor 26 is connected to the emitter of transistor 27 whose base is connected in turn to the emitter of transistor 28. The base of transistor 28 is connected in common with the cathode of a Zener diode 32 and one side of a resistor 33 whose other side is connected to the output path 34 emanating from the positive terminal 35 of constant voltage source 30. The return path 36 of the generator is connected in common to the collectors of the transistors 27 and 28. If desired, the output and return paths 34 and 36 may be connected across the load 6 through a reversing switch 37 for directional control of current polarity.

The current amplitude detector comprises a resistor 38 inserted in the output path 34, and a differential amplifier 39 having inputs 40 and 41 connected across the resistor 38. The output of the amplifier 39 is connected to a terminal 42 where it is functionally integrated with the amplitude control 9.

Optionally, as shown in the modification of FIGURE 2*a*, the differential amplifier 39, can be substituted by the composite amplifier **39*a* which may comprise a plurality of amplifiers 100 and 101 such as the Philbrick Research, Inc. amplifier model P45A indicated above. Such a composite amplifier 39*a* will include composits input 40*a* and 41*a* and a composite output 42*a* corresponding, respectively, to inputs 40 and 41 and the output 42 of amplifier 39 with the composite inputs 40*a* and 41*a* similarly connected across the resistor 38, in the output of current generator 5. Composite input 40*a* is connected through a resistor 102 to an input 103 of amplifier 100 whose output 104 is connected through resistor 105 to an input 106 of the amplifier 101. The input 106 of amplifier 101 will also be connected to composite input 41*a* through a resistor 112. A resistor 107 is shunted across the input 103 and output 104 of amplifier 100, and, similarly, a resistor 108 is shunted across input 106 and output 109 of amplifier 101 which is also connected to the composite output 42*a*. Each of the second inputs 110 and 111 of, respectively, amplifiers 100 and 101** is connected to ground.

The ampliture control 9 inuludes a tunnel diode 43 having its cathode connected to ground and its anode connected in common, at point 45, with the base of an NPN transistor 44 and through a resistor 46 to the collector of an PNP transistor 47. The anode of the tunnel diode 43 is also connected at point 45 to the juncture of a connected like pair of resistor 48 and 48′. The other side of resistor 48 is connected to terminal 42 to functionally integrate the amplitude control 9 with the current amplitude deector 8; and the other side of resistor 48′ is connected to the negative terminal 49 of a programmable reference voltage source 10, having its positive terminal 50 grounded. Any suitable programmable reference voltage source may be employed which enables the preselection of a reference potential, as for example, the model TR 0–18 unit of the Electronic Measurement Corp., Eaton Town, Pa.

Returning to the amplitude control 9, its indicated transisctor 44 has its emitter connected to ground, and is collector connected at junction point 50 through a resistor 51 to the base of an NPN transistor 52 and through a resistor 53 to a positive potential $+V_2$ which is also applied to the collector of the transistor 52. The emitter of transistor 52 is connected to the juncture of a condensor 54 and a resistor 55 which are connected in series circuit across the primary winding 56 of a transformed 57 with the common junction of resistor 55 and primary winding 56 connected to ground.

One side of the secondary winding 58, of transformer 51, is connected through a condensor 59 to an input terminal 60 of a one-shot multivibrator 61; and the other side of the secondary winding 58 is connected in common with the common reference source 17 and a secondary input terminal 62 of the multivibrator 61. One output terminal 63 of the multivibrator 61 is connected to common reference 17 and its other output terminal 64 is connected to the pulse generator output terminal 25 for functional integration therewith. A typical one-shot multivibrator for use in the amplitude control 9 is the Direct Coupled Silicon Monostable Multivibrator Circuit 6–16 on page 6–59 of the Department of Defense "Military Standardization Handbook of Selected Semiconductor Circuits," Mil–HDBK–215, June 15, 1960.

The amplitude control 9 also includes a Zener diode 65 whose cathode is connected to the source of positive potential $+V_2$, with the anode of the Zener diode 65 connected to the base of transistor 47 which is grounded through a resistor 66. The source of positive potential $+V_2$ also connected to the emitter of transistor 47 through a variable resistor 67 for adjustment of the amplitude control 9 so that the multivibrator will produce the desired control signal when the $+V_S$ potential from the output of amplifier 39 becomes equal to the $-V_P$ potential of the programmable reference voltage source 10.

The operation of the circuit of FIGURE 2 with reference to the timing diagram of FIGURE 3, is as follows: At time $t_0$, with the gate pulse at $+V$, diodes 11 and 13 both conduct and clamp the output of the pulse generator amplifier 16 slightly below common. This reverse biases transistor 26 and no current will flow from the current generator 5.

Also at $t_0$, with the trigger pulse at $+V$, diode 20 will conduct and raises Point "A" above common to approximately the $+V$ reverse biasing diodes 12 and 21. Point "B" will be held near common by amplifier 16 to reverse bias and also cut-off diode 12. With no $I_L$ current in the output path 34, the output of amplifier 39 is also zero, and Point "E" will therefor be negative with respect to ground because of the $-V_P$ of the programmable reference voltage source 10. As a result tunnel diode 43 and transistor 44 will be reverse biased, and the bias current $I_B$ will flow from transistor 47 to Point "E." This bias current $I_B$ is adjusted by variable resistor tor 67 so that when the positive potential $+V_S$ from the output of amplifier 39 to Point "E" equals the magnitude of the negative potential $-V_P$, of the reference voltage source 10, the tunnel diode 43 will switch through its negative resistance region to suddenly turn on transistor 44, which will occur at $t_3$. From time $t_0$ to $t_3$, transistor 52 will be forward biased to maintain capacitor 54 charged. While transistor 52 is conducting, the multivibrator 61 will be passive, and its output terminal maintained at a negative potential.

At time $t_1$, the negative excursion of a gate pulse, having a pulse width $t_1-t_6$ will shift the potential at input terminal 2 from +V to −V and reverse bias diode 11 to end the forward current through diode 13.

At time $t_2$, the negative excursion of the trigger pulse, having a short pulse width of $t_2-t_4$, will shift the potential at input terminal 3 from +V to −V, and thus reverse bias diode 20. As a result, diode 20 will be cut-off; and diode 12 will conduct a constant current from the output of amplifier 16 through condensor 19 and variable resistor 23 to the negative potential at terminal 22. This causes the output voltage waveform 4 of amplifier 16 to rise in a linear ramp whose rate of rise is determined by adjustment of variable resistor 23.

Transistor 26 and resistor 31 form a voltage follower and follow the generated ramp waveform 4 of amplifier 16. Zener diode 32 holds the base of transistor 28 at a constant potential; and as the collector of transistor 26 falls toward the ramp voltage, transistors 27 and 28 turn on also. The result is that the voltage of the constant voltage source 30 is divided between the resistor 38 (of detector 8), the load 6, and the drop from the collector of transistor 28 to the common reference 17. The voltage drop produced across the load 6 produces a current waveform "$I_L$" in output path 34 exactly like the voltage waveform 4 output of amplifier 16. This current is sensed in magnitude by the differential amplifier 39 connected across resistor 38 by its inputs 40 and 41. The output signal of amplifier 39 is fed to the amplitude control 9 as a $+V_S$ which is impressed through its resistor 48 at Point "E."

At some time $t_3$, as the $+V_S$ output potential from amplifier 39, which is impressed at Point "E," equals the $-V_P$ potential of the reference voltage source 10, which is impressed at Point "E," the bias current $I_B$ from transistor 47 will switch tunnel diode 43 and turn on transistor 44 very quickly. As a result, transistor 52 will turn off, and the negative pulse at the emitter of transistor 52 will be coupled through transformer 57 to the multivibrator 61. The output of multivibrator 61, through input 25 to diode 21, is a stop-amplitude control pulse shifting from a negative −V potential to a positive +V potential. As a result, diode 21 wil conduct and raise the potential at Point "A" to approximately +V again, and will thus cut-off diode 12. Condensor 19 will hold its charge for the remaining duration of the gate pulse, because of the high impedances of amplifier 16 and diodes 11, 12 and 13. The result is that transistor 26 will be biased at a steady value, and the $I_L$ will be constant.

At time $t_6$, when the gate pulse will return to its +V potential, diode 11 will be forward biased which will quickly discharge condensor 19 and forward bias diode 13. As a result, the output of amplifier 16 will fall slightly below common, and thus cutting of transistor 26 to end $I_L$ in output path 34.

In summary, a pulse generator 1 provides an input signal to a current generator 5. The output of current generator 5 to a load 6 is sensed by the current amplitude detector 8 which provide an operating signal $+V_S$ to the amplitude control 9 wherein it compared to a reference voltage source 10 and the amplitude control 9 then programs an output control signal to the pulse generator 1. When the pulse generator is activated in response to a plurality of correlated input pulses, a ramped output signal is provided to the current generator 5 to provide a directly proportional ramped current output. The current amplitude detector 8 senses the output of current generator 5 to provide an operational signal output to the amplitude control 9 in conjunction with the comparative reference potential of the reference voltage source 10. As the output of the current amplitude detector equals the reference potential of voltage source 10, the amplitude control 9 is activated to provide a stop control pulse to the pulse generator 1. The pulse generator will then lock up to enable the current generator to provide a constant current to the load.

In view of the little capacitance embodied in the circuit of the constant current pulse generator of this invention, it will respond in the micro-second region or better, and its output impedance is high (e.g. slightly less than collector resistance $R_c$, of transistor 27). Also, since tunnel diode 43 is normally reverse biased, there is little change of random noise causing transistor 44 to switch on prematurely so as to generate a stop amplitude control pulse. Further, in the absence of a negative excursion of the gate pulse, noise or shifts in supply voltage cannot accidently produce a current pulse. In general, the constant current pulse generator of this invention is not susceptible to oscillations caused by interaction between the generator and the load. Accuracy of the pulsed current generated is independent of any non-linear characteristics of the current generator 5. The invention also provides a constant current pulse generator which can be operated with a remotely programmable current pulse magnitude, current pulse width and duty cycle. In sum, the magnitude of the current to be generated is limited only by the power and current rating of the transistors of current generator 5 and the ability of the constant voltage source to deliver the current instantaneously and for the duration of its pulse. Secondly, the response of the constant current pulse generator, of this invetnion, to changes in load impedance is limited only by the frequency response of the transistors of current generator 5. Thus, once the current level has been set by the feedback circuit to the pulse generator 1, the response to a sudden change in load impedance will be as fast as the current generator transistors 27 and 28 can react to the change and hold the current constant. In general, this response can be determined by the transistors selected and used. Finally the magnitudes of the compliance voltage available to the load is limited only by the breakdown voltage rating of the transistors of the current generator 5, and that which the voltage source can deliver.

Thus, while the invention has been particularly shown and described with reference to the preferred embodiments thereof, it will be understood by those skilled in the art that the foregoing and other various changes in form and details may be made therein without departing from the spirit and scope of the invention.

What is claimed is:

1. A constant current pulse generator comprising:
   - a pulse generator for generating a voltage waveform in a continuously increasing amplitude;
   - a current generator responsive to said pulse generator and having an output path for providing a current thereto directly proportional to said waveform;
   - sensing means for sensing a voltage drop in said output path when connected across a load;
   - a source of preselectable reference potential; and control means responsive to said reference potential and said sensing means to, both,
     - (a) discontinue further increase in the amplitude of said voltage waveform, and
     - (b) fix the amplitude of said voltage waveform when said voltage drop reaches a predetermined level of said reference potential.

2. A constant current pulse generator comprising:
   - a pulse generator for generating a voltage waveform having a controllable amplitude;

a current generator having an output path for providing a current thereto directly proportional to said waveform;
sensing means for sensing a voltage drop in said output path when connected across a load;
a source of preselectable reference potential; and
control means responsive to said reference potential and said sensing means to fix the amplitude of said voltage waveform when said voltage drop reaches a predetermined value of said reference potential; and wherein said pulse generator comprises:
an amplifier having input and output terminals, generating said voltage waveform;
a first diode and a capacitor connected in a parallel circuit across an input and an output of said amplifier, with said first diode biased to the output terminal of said amplifier;
a second diode having its cathode connected to said amplifier input and biased normally conducting;
a third diode having its anode connected to said amplifier input;
a variable resistor for controlling the ramp of the leading edge of said voltage waveform with said resistor connected between the cathode of said third diode and a source of negative potential;
a fourth diode having its cathode connected to the cathode of said third diode and biased normally conducting; and
circuit means connecting said generator output to said current generator.

3. The constant current pulse generator of claim 2 wherein said current generator comprises:
a constant voltage source having an input terminal and an output terminal connected to an output path of said current generator;
a first transistor having its base connected to the output of said amplifier;
a Zener diode having its anode connected to the said input terminal of said voltage source;
a resistor connected between the emitter of said first transistor and the said input of said voltage source;
a second transistor having its base connected to the cathode of said Zener diode;
a third transistor having its base connected to the emitter of said second transistor;
circuit means connecting the emitter of said third transistor to the collector of said first transistor; and
second circuit means connecting the collectors of said second and third transistor in common to a return path of said current generator.

4. The constant current pulse generator of claim 3 wherein said sensing means includes a second amplifier and wherein said control means comprises:
a tunnel diode having its anode connected in common to the said output terminal of said second amplifier and to said preselectable reference potential with said tunnel diode biased normally non-conducting;
a fourth transistor having its base connected to the anode of said tunnel diode and biased normally non-conducting;
a fifth transistor having its collector connected to the said anode of said tunnel diode;

a second variable resistor for controlling conduction in said fourth transistor when the output voltage of said second amplifier reaches a predetermined value of said reference potential with said second variable resistor being connected between a source of positive potential and the emitter of said fifth transistor;
a sixth transistor having its base and collector shunted to said source of positive potential;
circuit means connecting the base of said sixth transistor to the collector of said fourth transistor;
a transformer having primary and secondary windings;
a second resistor and a capacitor connected in series across said primary winding with said second resistor connected at its junction with said condenser to the emitter of said sixth transistor for biasing thereof normally conducting;
a one-shot multivibrator having input and output terminals with the input terminals thereof connected through a second condenser across said secondary winding; and
circuit means connecting the output of said multivibrator to the anode of said second diode comprising said pulse generator.

5. The constant current pulse generator of claim 4 wherein said sensing means comprises a third resistor connected in series in the output path of said current generator;
a second amplifier having input and output terminals with input terminals thereof connected across said second resistor; and
circuit means connecting an output terminal of said second amplifier to said control means.

6. A constant current pulse generator comprising:
a pulse generator adapted to generate a voltage waveform in a continuously increasing amplitude;
a current generator responsive to said pulse generator and having an output path for providing a current thereto directly proportional to said waveform;
a voltage source to provide a preselectably variable reference potential;
comparison means for comparing the voltage value of said current with said reference potential; and
control means to, both,
(a) discontinue further increase of in the amplitude of said voltage waveform, and
(b) fix the amplitude of said voltage waveform when said current reaches a predetermined voltage value of said reference potential.

References Cited

UNITED STATES PATENTS

| | | | |
|---|---|---|---|
| 3,174,054 | 3/1965 | Wortzman | 328—172 X |
| 3,197,691 | 7/1965 | Gilbert | 321—18 |
| 3,237,088 | 2/1966 | Karp et al. | |
| 3,264,550 | 8/1966 | Paice | 323—9 |

LEE T. HIX, Primary Examiner

A. D. PELLINEN, Assistant Examiner

U.S. Cl. X.R.

323—9; 328—173